April 12, 1932.  E. E. WESEMAN ET AL  1,854,088

SIGNALING DEVICE

Filed June 9, 1928

Elmer E. Weseman
Charles F. Wenzel Inventor

By Victor J. Evans

Attorney

Patented Apr. 12, 1932

1,854,088

UNITED STATES PATENT OFFICE

ELMER E. WESEMAN, OF PLAINFIELD, AND CHARLES F. WENZEL, OF DUNELLEN, NEW JERSEY

SIGNALING DEVICE

Application filed June 9, 1928. Serial No. 284,133.

This invention relates to vehicle signals and has for an object the provision of a "stop" signal having means for controlling the same through the operation of the brake or clutch pedal of the vehicle, together with means for operating said signal through the medium of a swingingly mounted closure provided for a hand opening, so that the signal will be rendered active when the hand of the driver is thrust outward, or when the pedal is operated, or both.

With the above and other objects in view, the invention further includes the following novel features and details of construction, to be hereinafter more fully described, illustrated in the accompanying drawings and pointed out in the appended claim.

Figure 1:
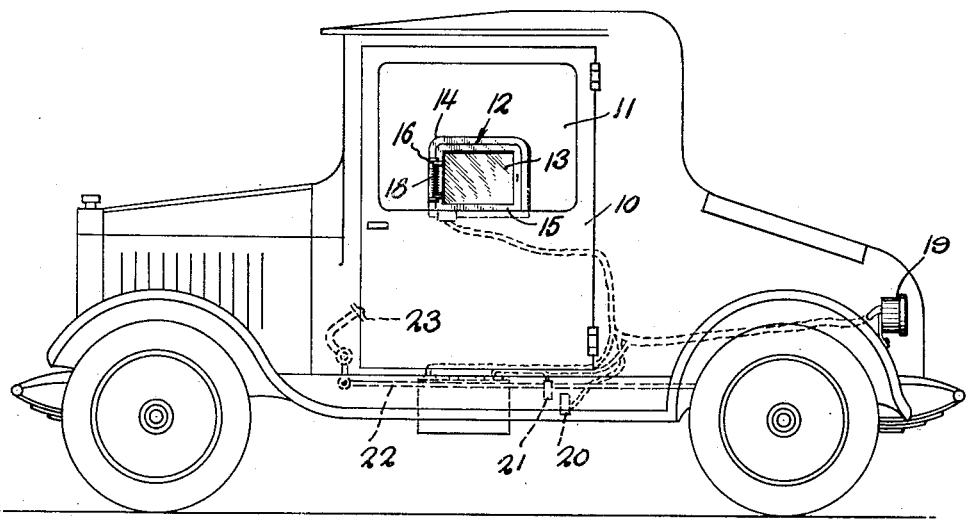
Figure 1 is a side elevation of an automobile with the invention applied.
Figure 2:
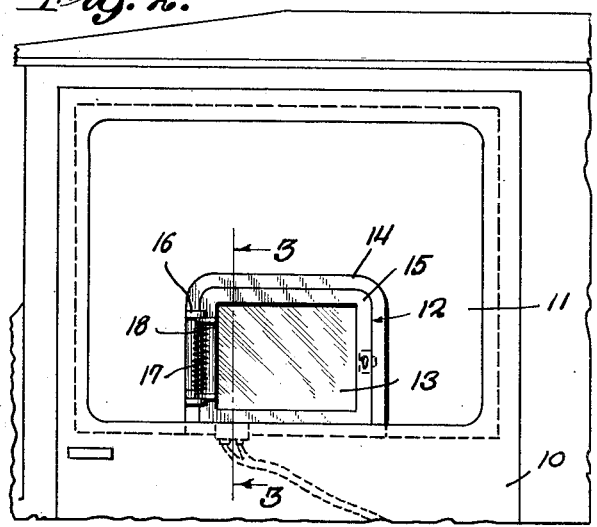
Figure 2 is an enlarged fragmentary side view showing the hand signal opening.
Figure 3:
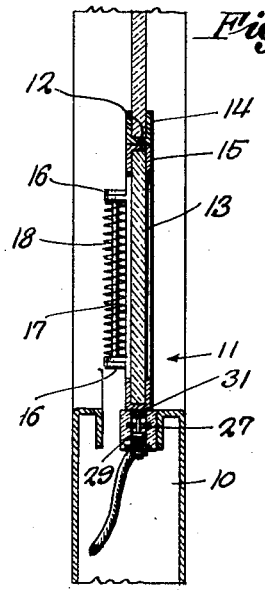
Figure 3 is an enlarged section on the line 3—3 of Figure 2.

Referring to the drawings in detail wherein like characters of reference denote corresponding parts, the invention is shown as applied to a closed automobile in which the door is indicated at 10 and the glass panel which closes the window opening is indicated at 11. This glass is raised and lowered in the usual or any preferred manner, but differs from the ordinary glass panel in that it is provided with an opening 12 which is normally closed by a door 13.

Various means may be employed for mounting the door, the means shown consisting of a frame 14 which embraces the edges of the opening 12 and a frame 15 which embraces the edges of the door 13. These frames have extending therefrom spaced ears 16 within which is mounted a hinge pin 17 while the latter is surrounded by a torsion spring 18 which acts to yieldingly hold the door in closed position. If desired, a latch or other holding device may be provided for the door.

Figure 4:
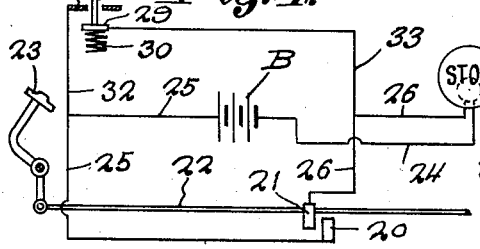
Figure 4 is a diagrammatic view illustrating the wiring.

The signal which may be of any suitable type, but preferably consists of a stop signal is indicated at 19 and is suitably mounted upon the vehicle. This signal is included in circuit with the battery B and with a circuit closer or switch, the stationary member of which is shown at 20 while the movable member is mounted upon the brake rod 22 to which is attached the usual brake pedal 23. The battery B is connected to the signal light by means of a conductor 24 and to the stationary contact 20 by a conductor 25, while a conductor 26 connects the movable contact 21 with the stop light. By reference to Figure 4 of the drawings it will be seen that when the brake pedal 23 is depressed, the contact 21 will engage the contact 20 and complete a circuit through the battery and lamp of the signal.

Arranged within the lower portion of the frame 14 of the door 13 is a switch which includes a stationary contact 27 through which operates a plunger 28 and carried by the lower end of this plunger is a movable contact 29 which is forced into engagement with the contact 27 by means of a spring 30. The upper end of the plunger 28 carries a head 31. The contact 27 is tapped on to the conductor 25 by means of a conductor 32, while the contact 29 is tapped on to the conductor 26 by means of a contact 33 and by reference to Figure 4 it will be seen that when the contact 29 is free to move upward under the action of the spring 30, this contact will engage the contact 27 and complete a circuit through the battery B and the signal 19 (the lamp of the signal).

As the button 31 of the plunger is arranged to be engaged by the frame 15 when the door is in closed position, the plunger will be normally depressed so as to separate the contacts 27 and 29, and the circuit to the signal will be normally open. However, when the driver desires to signal with his hand, the door 13 is swung outward, whereupon the spring 30 will cause the contacts 27 and 29 to engage in the manner previously stated. The driver may thus signal in advance of a stop, and when the brake pedal is depressed to stop the vehicle, his hand may be withdrawn while the signal will remain active due to the engagement of the contacts 20 and 21.

While the invention is shown applied to a closed type of body, it is obvious that it may be applied to the side curtain of an open body vehicle.

The invention is susceptible of various changes in its form, proportions and minor details of construction and the right is herein reserved to make such changes as properly fall within the scope of the appended claim.

Having described the invention what is claimed is:

A device of the character set forth including a transparent panel of a motor vehicle door having a rectangular opening, a channeled frame mounted in the opening and receive the panel about the opening, a second channeled frame arranged within the first frame, a transparent panel mounted in the channel of the second frame, pairs of ears on said frames, a hinge pin extending through the ears, and a spring mounted on the pin for normally urging the second frame within the first frame and to permit a person to swing the second frame outwardly of the first frame when extending the arm and hand through the first frame to give a signal.

In testimony whereof we affix our signatures.

ELMER E. WESEMAN.
CHARLES F. WENZEL.